United States Patent [19]

Heffelfinger

[11] Patent Number: 5,266,803
[45] Date of Patent: Nov. 30, 1993

[54] FIBER OPTIC STORAGE PHOSPHOR IMAGING PLATE SCANNER

[75] Inventor: David M. Heffelfinger, San Pablo, Calif.

[73] Assignee: Bio-Rad Labratories, Inc., Calif.

[21] Appl. No.: 845,107

[22] Filed: Mar. 3, 1991

[51] Int. Cl.$^5$ .............................................. G03B 42/02
[52] U.S. Cl. .................................. 250/582; 250/458.1
[58] Field of Search ............... 250/327.2 E, 327.2 F, 250/327.2 L, 327.2 C, 458.1

[56] References Cited

U.S. PATENT DOCUMENTS

| | | | |
|---|---|---|---|
| 3,588,514 | 6/1971 | Simpkins | 250/226 |
| 3,721,828 | 3/1973 | Parks | 250/566 |
| 3,746,840 | 7/1973 | Ogland et al. | 235/473 |
| 3,836,225 | 9/1974 | Wilde et al. | 385/115 |
| 3,892,468 | 7/1975 | Duguay | 385/4 |
| 3,991,318 | 11/1976 | Duguay | 250/208.1 |
| 4,467,196 | 8/1984 | Balliet et al. | 250/227.13 |
| 4,490,740 | 12/1984 | Moriguchi | 358/75 |
| 4,702,552 | 10/1987 | Morgolin | 385/121 |
| 4,748,680 | 5/1988 | Margolin | 382/65 |
| 4,841,142 | 6/1989 | Waszkiewicz | 358/443 |
| 4,853,547 | 8/1989 | Bach | 250/458.1 |
| 4,877,966 | 10/1989 | Tomei et al. | 250/458.1 |
| 4,917,454 | 4/1990 | Feder | 250/227.23 |
| 4,922,102 | 5/1990 | Katayama | 250/327.2 |

FOREIGN PATENT DOCUMENTS

| | | | |
|---|---|---|---|
| 0342979 | 11/1989 | European Pat. Off. | 250/458.1 |
| 60-93425 | 5/1985 | Japan | 250/327.2 |
| 2-163733 | 6/1990 | Japan | 250/327.2 |
| 2-306235 | 12/1990 | Japan | 250/327.2 |
| 3-80240 | 4/1991 | Japan | 250/327.2 |

OTHER PUBLICATIONS

M. L. Myrick, Stanley M. Angel and Russell Desiderio, "Comparison of some fiber optic configurations for measurement of luminescence and Raman scattering." Applied Optics, vol. 29, No. 9 (20 Mar. 1990) pp. 1333-1344.

Johnston et al. Electrophoresis 11:355-360 (1990).

Bio-Rad Laboratories, "New Model GS-250 Phosphorimager, Molecular Biology Image Analysis".

Molecular Dynamics, "PhosphorImager—Autoradiography using Storge Phosphor Technology".

Primary Examiner—Constantine Hannaher
Attorney, Agent, or Firm—Townsend and Townsend Khourie and Crew

[57] ABSTRACT

A novel fiber optic cable having a bifurcated bundle of optical fibers comprised of emitter fiber(s) and collecting fiber(s), a means for focusing light into the proximal end of the emitter fiber(s), a means for focusing light out of the distal end of the emitter fiber(s), and a means for collecting light in the distal end of the collecting fiber(s) is used to increase the sensitivity and specificity of storage phosphor imaging plate scanning. The novel fiber optic cable is used in a storage phosphor imaging plate scanner to transmit light from a light source to the phosphors on the storage phosphor imaging plate and to collect any phosphorescence induced by the light. Use of the bifurcated fiber bundle with the means for focusing light into the emitter fiber(s), focus light out of the emitter fiber(s), and collect light in the collecting fiber(s) provides a method to scan storage phosphor imaging plates with high sensitivity and specificity.

34 Claims, 3 Drawing Sheets

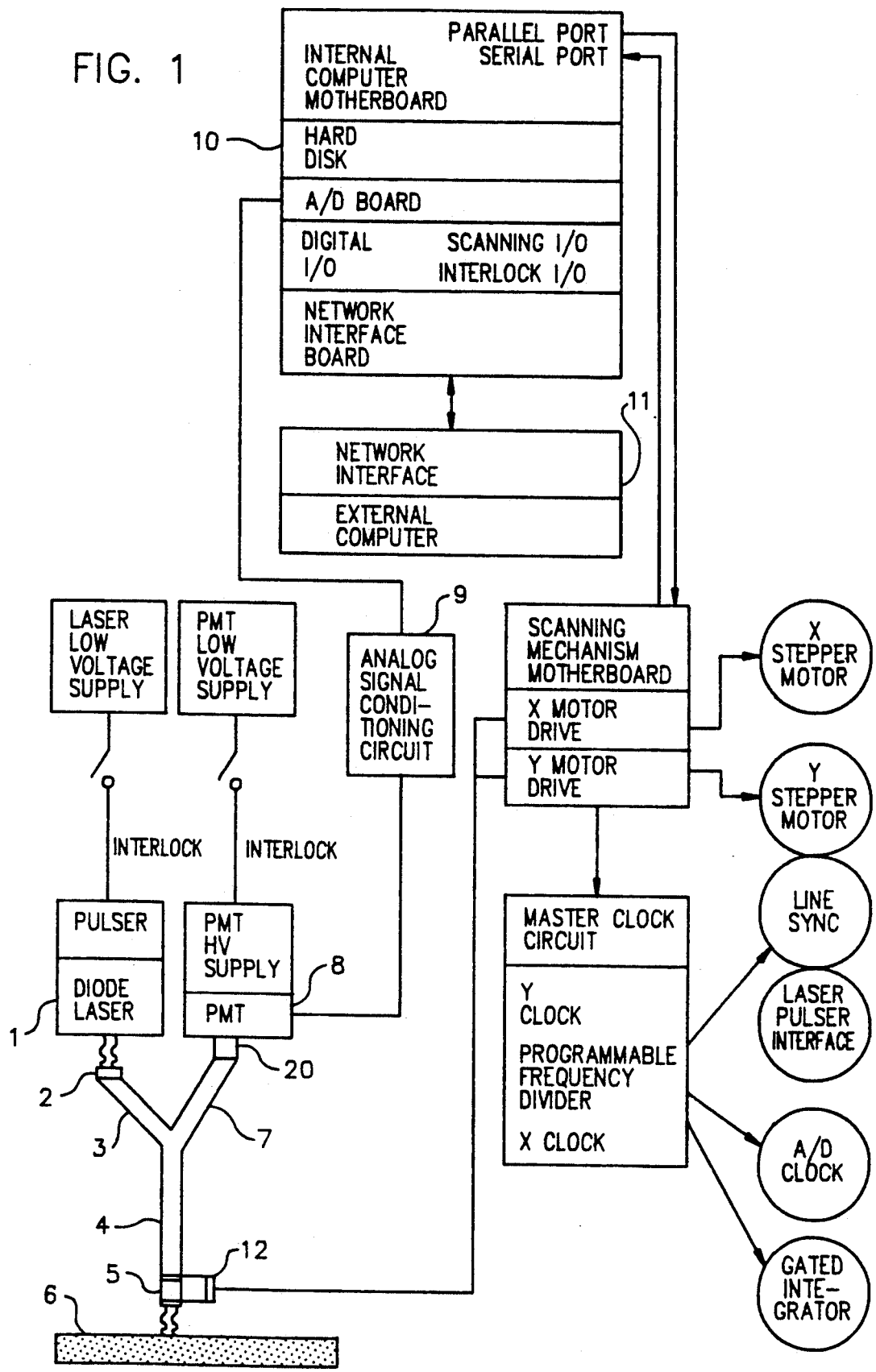

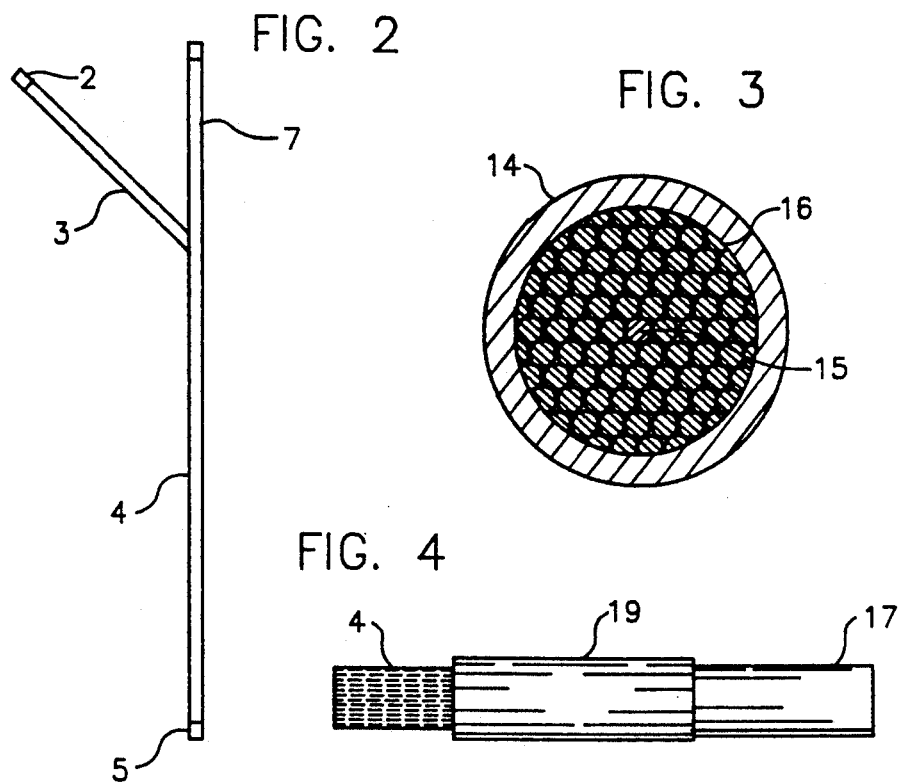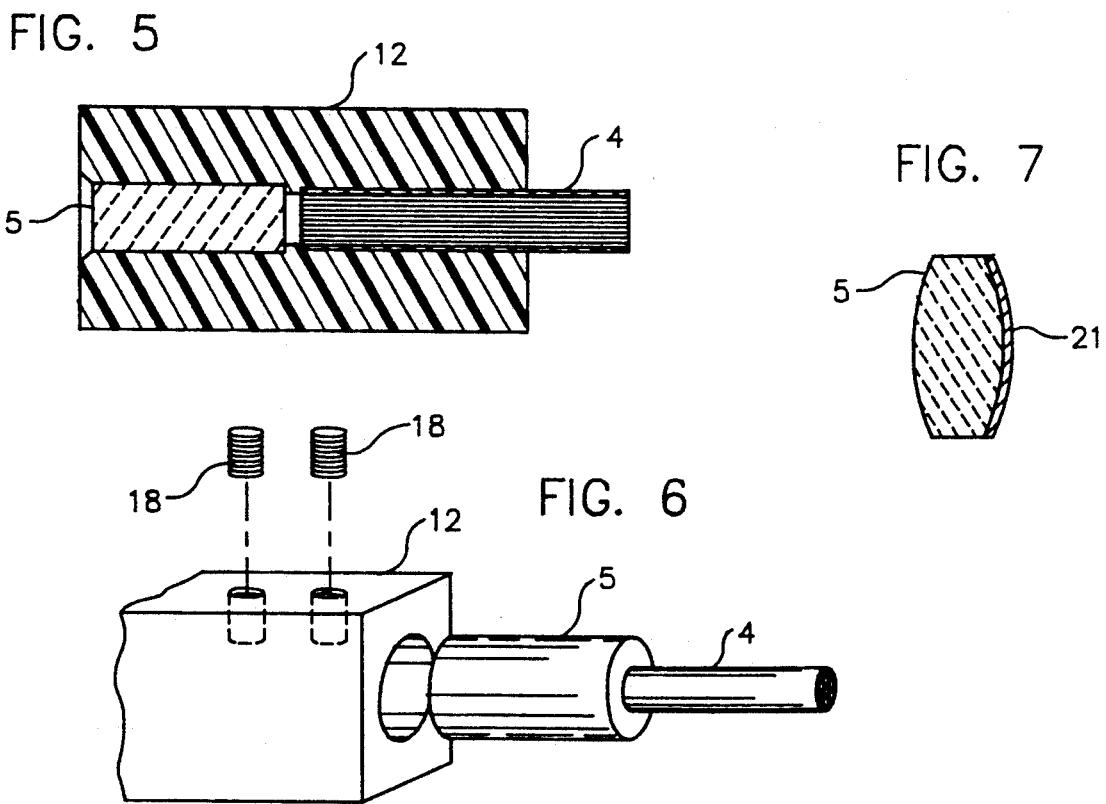

FIBER OPTIC STORAGE PHOSPHOR IMAGING PLATE SCANNER

BACKGROUND OF THE INVENTION

1. Field of the Invention

This invention relates generally to optical scanners and, more particularly to devices and methods useful in scanning storage phosphor imaging plates.

2. Description of the Background Art

Phosphors emit light energy upon exposure to other radiant energy (phosphorescence). Phosphors absorb radiant energy which excites electrons in the phosphor into higher energy states. The higher energy states are unstable and the phosphor electrons fall back into a lower energy state emitting the energy differential as light. Typically, the emitted light energy has a different wavelength than the radiant energy inducing the phosphorescence.

Phosphors have many uses, e.g., television picture cathode ray tubes. Storage phosphors, however, have distinct properties that make them highly desirable as detectors of light and other forms of radiation. Storage phosphors remain in an excited state for very long time scales. While phosphors generally relax to their ground state after excitation in a matter of a few thousandths or hundredths of a second, storage phosphors retain an excited state for days or even weeks. This property is referred to in this application as retention. For example, storage phosphors have been patented and produced that have a retention of up to 75% in a 24 hour period when exposed to samples labeled with $^{32}P$, a radioactive isotope.

Storage phosphors retain a latent image when exposed to a two dimensional pattern of radiation, analogous to film. Storage phosphors, however, do not require development. In storage phosphors the latent image is obtained by reading out the storage phosphor with a scanning beam of light. The read out beam produces an emission from the storage phosphor The color of the emission is different from the readout color. The intensity of the emission is proportional to the original degree of localized radiation exposure retained by the storage phosphor.

Storage phosphors have a very high quantum efficiency when exposed to some types of radiation and so are desirable as a storage medium. Storage phosphors have been proposed as detectors of radioactively labeled biological samples. Storage phosphors have also been proposed as optical information storage devices and optical matrix processors.

Different devices for scanning reflected and phosphorescent light have been described. Simpkins, U.S. Pat. No. 3,588,514, discloses a reflected light facsimile scanner utilizing optical fiber bundles containing emitting and collecting fibers.

Ogland et al., U.S. Pat. No. 3,746,840, discloses a device for high resolution readout of information stored on a film. The device comprises a slit equal in width to the desired resolution with optical fibers behind the slit of a diameter equal to the slit width. As light crosses the slit, the optical fibers collect the light and transmit it to detectors.

Wilde et al., U.S. Pat. No. 3,836,225, discloses fiber optic laser scanners which use two optical fiber sets attached to electromagnetic magnetic coils which can deflect the beam in perpendicular dimensions.

Duguay, U.S. Pat. No. 3,892,468, discloses a passive array of variable length optical fibers which function as a dynamic scanner. Each consecutive fiber is incrementally longer than the preceding fiber so that light entering the fibers at the same time exits the fibers at different times and can be correlated with a different location.

Balliet et al., U.S. Pat. No. 4,467,196, discloses a manually controlled bar code scanner probe. The scanner includes a single optical fiber which alternately emits and collects light. The probe contains a half mirror allowing both emission and collection of light in the single optical fiber.

Waszkiewicz, U.S. Pat. No. 4,481,142, discloses a method to control scanner resolution by reading variable numbers of sensors in a sensor array.

Moriguchi, U.S. Pat. No. 4,490,740, discloses a multi-color optical reading device which comprises a high intensity light and several filters of different hues. The light of different hues is transported to the reading plate by optical fibers and is reflected to mirrors and a detector.

Margolin, U.S. Pat. No. 4,748,680, discloses a color scanning device utilizing a plurality of fiber optic arrays similar to Waszkiewicz in which each array corresponds to a different color associated with a color filter.

Tomei et al., U.S. Pat. No. 4,877,966, discloses a device for measurement of low-level laser induced phosphorescence. The laser is directed through a beam expander and then aimed by mirrors. The induced phosphorescence is collected by a fiber optic face plate and passed to a photomultiplier tube.

The scanners described above do not take full advantage of the potential of storage phosphors. Storage phosphors have an inherently high capacity for storing incident radiation in a latent image. Storage phosphors have an inherent dynamic range on the order of $10^5$ and higher. Scanners of storage phosphors need to have the highest possible collection efficiency of the light emitted by the storage phosphors. The lower the smallest unit of light that can be discerned by the scanner, the greater the dynamic range of the scanner.

Further, scanners which emit radiation or collect phosphorescence from a relatively large area of the plate lose specificity. Storage phosphor scanners require high resolution or a very small spot size of the read out beam.

Also, the scanners must be capable of differentiating between reflected radiant energy and phosphor emissions. Often, more reflected radiant energy than phosphorescence strikes scanner collecting mechanisms. In order to accurately read the information stored on the plate, the scanner must only sense the phosphorescence.

Storage phosphors can resolve features in the original sample as small as one tenth of a millimeter. In some cases, it may be desirable to be able to read out the latent image at a low resolution to minimize scan time and to minimize the amount of memory required to store an image. It may then be desirable to go back and scan sub-regions or features of the latent image in the storage phosphor that require higher resolution. This requires a scanner with not only high resolution and specificity, but also repeatable alignment of a low resolution scan with a subsequent high resolution scan. This requires a scanner with an addressable scanning head design. This would also be required for scanners used to retrieve information from storage phosphors used as optical memory devices.

For these reasons it is desirable to provide scanning devices capable of exciting phosphorescence in a localized region of a storage phosphor imaging plate and efficiently collecting and sensing low level phosphorescence. The present invention provides a system for precise and efficient excitation and collection of phosphorescence.

SUMMARY OF THE INVENTION

The present invention provides a storage phosphor imaging plate scanner which is both sensitive and highly specific. A novel optical fiber cable incorporated in the scanner allows both precise localization of exciting radiation and efficient collection of induced phosphorescence.

The novel optical fiber cable comprises a bifurcated optical fiber bundle, a means for focusing light into the proximal end of at least one emitter fiber, a means for focusing light out of the distal end of at least one emitter fiber, and a means for collecting light in the distal end of at least one collecting fiber.

The bifurcated optical fiber bundle has proximal and distal ends and comprises two discrete sets of optical fibers: at least one emitter fiber and at least one collecting fiber. Proximally, the emitter fiber(s) is joined to a means for directing light into the emitter fiber(s). Distally, the emitter fiber(s) is joined to a means to direct light out of the emitter fiber(s). Also located distally is a means to direct light into the collecting fiber(s). The distal ends of the emitter fiber(s) and the collecting fiber(s) are geometrically arranged so as to allow the collecting fiber(s) to efficiently collect phosphorescence induced by light from the emitter fiber(s).

In one illustrative embodiment of the invention, the bifurcated optical fiber bundle contains a single emitter fiber surrounded by a plurality of collecting fibers at the distal end. The means for focusing light into the emitter fiber is a graded index (GRIN) lens which provides efficient transmission of light from the light source to the emitter fiber. A single focusing/imaging lens comprises the means for focusing light out of the emitter fiber and collecting light in the collecting fibers. The focusing/imaging lens both focuses the emitted light to a small spot thereby increasing resolution, and efficiently collects phosphorescence thereby increasing sensitivity. At the junction of the emitter fiber, collecting fibers and the focusing/imaging lens, the single emitter fiber lies at the center of a cylindrical arrangement of collecting fibers.

The invention also provides a scanning device incorporating the novel optical fiber cable. The scanner comprises a light source, the novel optical fiber cable, a scanning mechanism, and an electronic data gathering system.

In the scanning device incorporating the novel optical fiber cable, light radiation from the light source is focused into the emitter fiber. The light radiation transmitted through the emitter fiber is focused onto the storage phosphor imaging plate. If light emitted from the emitter fiber strikes a region of the phosphor where charge is retained, the phosphor will be read out and emit phosphorescence. Phosphorescence is directed into the collecting fiber(s). The phosphorescent emissions are transmitted to a sensor which relays electronic signals representing the phosphorescence to an information storage device.

A novel method to scan storage phosphor imaging plates is also provided. The method comprises transmitting radiation capable of inducing phosphorescence through one set of optical fibers in an optical fiber cable and collecting any induced phosphorescence in different fibers of the optical fiber cable.

BRIEF DESCRIPTION OF THE DRAWINGS

FIG. 1 is block diagram of a storage phosphor imaging plate scanner illustrating the principles of the present invention.

FIG. 2 is a perspective diagram of one embodiment of a bifurcated optical fiber bundle constructed in accordance with the principles of the present invention.

FIG. 3 is a cross-sectional view of one embodiment of a bifurcated optical fiber bundle constructed in accordance with the principles of the present invention.

FIG. 4 is an axial cut away view of the distal portion of one embodiment of a bifurcated optical fiber bundle constructed in accordance with the principles of the present invention.

FIG. 5 is an axial cross sectional view of one embodiment of a scanning head constructed in accordance with the principles of the present invention.

FIG. 6 is a perspective view of a scanning head constructed in accordance with the principles of the present invention.

FIG. 7 illustrates a lens having an anti-reflective coating such as may be used in certain embodiments of the present invention.

DESCRIPTION OF THE SPECIFIC EMBODIMENTS

Figure 8:
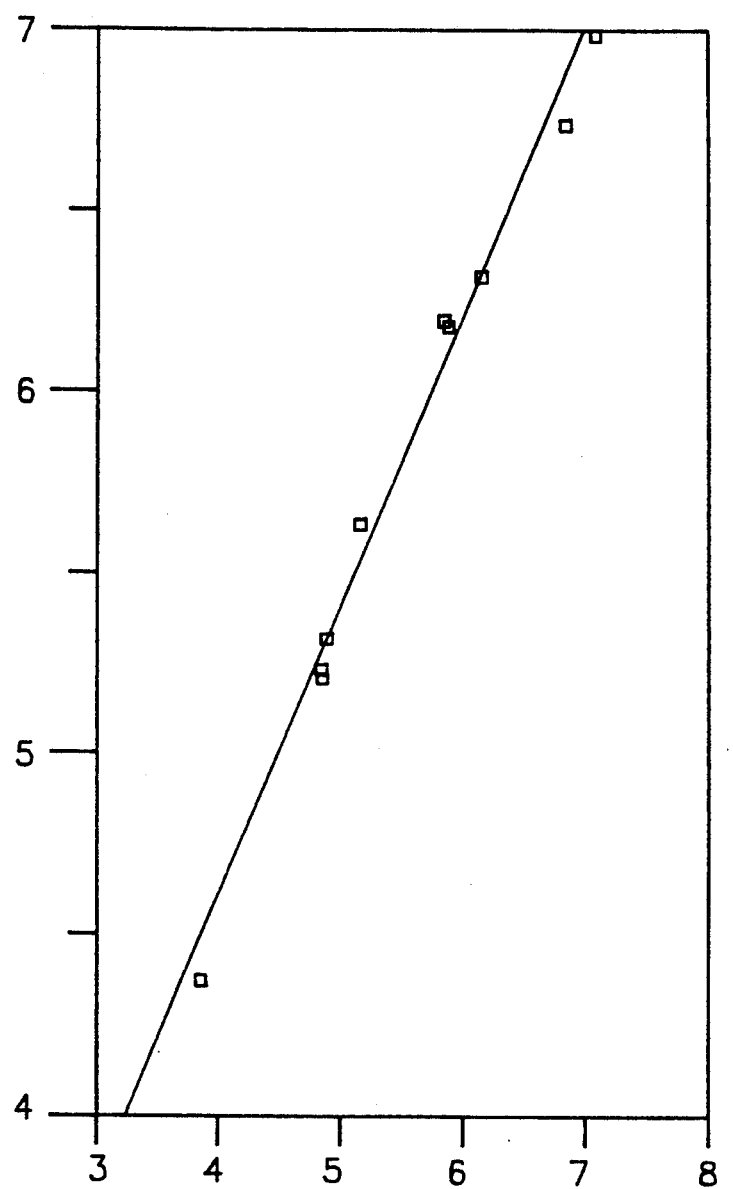
FIG. 8 illustrates the dynamic range of a scanner constructed in accordance with the principles of the present invention.

According to the present invention, devices and provided for scanning storage phosphor imaging plates. The invention may be practiced on storage phosphor imaging plates containing a variety of phosphors.

The present invention provides an optical fiber cable for scanning storage phosphor imaging plates comprising a bifurcated bundle of optical fibers having distal and proximal ends, the optical fibers comprising at least one emitter fiber and at least one collecting fiber, a means for focusing light into the proximal end of the at least one emitter fiber, a means for focusing light out of the distal end of the at least one emitter fiber; and a means for collecting light in the distal end of the at least one collecting fiber.

In one illustrative embodiment of the invention, the optical fiber cable comprises a bifurcated bundle of optical fibers having distal and proximal ends, the optical fiber cable further comprising at least one emitter fiber and at least one collecting fiber, a GRIN type coupling lens joined to the proximal end of the at least one emitter fiber, and a focusing/imaging lens joined to the distal ends of at least one emitter fiber and at least one collecting fiber.

The invention also provides a storage phosphor imaging plate scanner comprising a light source; an optical fiber cable comprises a bifurcated bundle of optical fibers having distal and proximal ends, the optical fiber cable further comprising at least one emitter fiber and at least one collecting fiber, a GRIN type coupling lens joined to the proximal end of the at least one emitter fiber, and a focusing/imaging lens joined to the distal ends of the at least one emitter fiber and at least one collecting fiber; a lens mount secured to the distal end of the optical fiber cable; a scanning mechanism joined to the lens mount; a sensor joined to the proximal ends of the collecting fibers in the optical fiber cable; signal conditioning electronics which receive input from the sensor; and a data storage device which receives input from the signal conditioning electronics.

The invention also provides a method for scanning a storage phosphor imaging plate comprising transmitting radiation from a light source into at least one selected optical fiber of an optical fiber bundle and, upon emerging therefrom, to the storage phosphor imaging plate, collecting phosphorescence induced by the radiation from the light source in at least one optical fiber of the optical fiber bundle other than the selected optical fiber, transmitting the phosphorescence induced by the radiation from the light source to a sensor, transmitting information representative of the phosphorescence induced by the radiation from the light source from the sensor to a data storage device.

As used herein, the term "light" refers to any type of electromagnetic radiation capable of inducing phosphorescence. Light includes any type of electromagnetic radiation, e.g., electromagnetic radiation in the visible spectrum, electromagnetic radiation in the infrared spectrum, electromagnetic radiation in the ultraviolet spectrum, and the like. A light source is any device capable of producing electromagnetic radiation which can induce phosphorescence.

One element of the optical fiber cable is a bifurcated bundle of optical fibers. The term "bifurcated" is used herein to denote that the fibers in the bundle fall within two groups—one group designated as "emitter" fiber(s) and serving the function of transmitting radiation from a light source to the storage phosphor imaging plate, and the other group designated as "collecting" fiber(s) and serving the function of collecting induced radiation from phosphors on the plate and transmitting the phosphorescence thus collected to a sensor. The emitter fiber(s) may be chosen so as to optimize the transmission of the radiation from the light source. The collecting fiber(s) may likewise be chosen so as to optimize the transmission of the phosphorescence from the storage phosphor imaging plate.

Proximally, the emitter fiber(s) and the collecting fiber(s) are not joined in the optical fiber cable. The separation of the emitter fiber(s) and the collecting fiber(s) facilitates connection with a light source and sensor. The proximal portions of the emitter fiber(s) and the collecting fiber(s) which are not joined may be separately surrounded by a flexible protective covering such as PVC monocoil, plastic flexible tubing, or the like. The length of the unjoined portion of the emitter fiber(s) is not critical and may vary. Generally, the length of the unjoined portion of the emitter fiber(s) is about 25 cm to about 200 cm, usually about 25 cm to about 35 cm and preferably about 30 cm. Likewise, the length of the unjoined portion of the collecting fiber(s) is not critical and may vary. Generally, the length of the unjoined portion of the collecting fiber(s) is about 25 cm to about 200 cm, usually about 25 cm to about 35 cm and preferably about 30 cm.

Distally, the emitter fiber(s) and the collecting fiber(s) are held together in a flexible protective covering such as PVC monocoil, plastic flexible tubing, or the like. The length of the joined portions of the emitter fiber(s) and the collecting fiber(s) is not critical and may vary. Generally, the length of the joined portions of the emitter fiber(s) and the collecting fiber(s) is about 25 cm to about 200 cm, usually about 50 cm to about 100 cm and preferably about 60 cm.

The number of fibers in each group is not critical and may vary, such that each group contains at least one such fiber. In general, the number of fibers in each group will not exceed about 300, although this is likewise not critical. In preferred embodiments of the invention, the number of emitter fibers will range from about 1 to about 10, and the number of collecting fibers will range from about 1 to about 300. In particularly preferred embodiments, the number of emitter fibers will be less than the number of collecting fibers, and in the most preferred embodiments, only one emitter fiber is included in the bundle while about 100 to about 200 collecting fibers are included.

The physical arrangement of the fibers in the bundle and the shape of the bundle cross section are also not critical and may vary. Any arrangement of cross sectional shape may be used depending on the number of each type of fiber. In general, particularly for those embodiments in which the number of collecting fibers exceeds the number of emitter fibers, arrangements in which the emitter fiber(s) occupy the center of the bundle, surrounded by collecting fibers, are preferred. As for the bundle cross section, circular cross sections are preferred.

The emitter fiber(s) are individually surrounded by a cladding such as fused silica, glass, polyimide, other polymers, or the like. The emitter fiber(s) may have an internal diameter of 10 $\mu$m to 1,000 $\mu$m, usually 10 $\mu$m to 200 $\mu$m, and preferably 200 $\mu$m. The numerical aperture of the emitter fiber(s) may be 0.1 to 0.5, usually 0.2 to 0.4 and preferably, 0.4. The emitter fiber(s) are uninterrupted throughout their length in both the joined and unjoined portions of the optical fiber cable.

The collecting fiber(s) are individually surrounded by a cladding such as fused silica, glass, polyimide, other polymers, or the like. The collecting fiber(s) may have an internal diameter of 10 $\mu$m to 1,000 $\mu$m, usually 10 $\mu$m to 200 $\mu$m, and preferably 200 $\mu$m. The numerical aperture of the collecting fiber(s) may be 0.1 to 0.5, usually 0.2 to 0.5 and preferably 0.5. The collecting fiber(s) are uninterrupted throughout their length in both the joined and unjoined portions of the optical fiber cable.

Proximally, the emitter fiber(s) are joined to a means for focusing light into the emitter fiber(s). The light focusing means may be a lens, modules comprising curved mirrors to focus the beam, or multi-lens devices. Use of a light focusing means for focusing the incoming light increases the light gathering efficiency of the emitter fiber(s). Generally, the light focusing means will be a lens, and preferably a graded index (GRIN) lens. A GRIN lens is preferred because it causes less attenuation of the light beam and more efficient light transmission. The refractive index of the lens will be in the range of about 1.5 to about 1.66, preferably about 1.59. The pitch of the lens will generally be in the range of about 0.1 to about 0.99 and preferably about 0.33. The lens may be coated with an anti-reflective coating such as $MgF_2$, HEBBAR ® coatings, V-coatings or the like. A GRIN lens may be coupled to the emitter fiber(s) so that the energy losses including coupling losses and optical fiber attenuation do not exceed 60%. The lens may be disposed in a three dimensional positioner to minimize coupling losses.

The distal end of the emitter fiber(s) is joined to a means for focusing light emerging from the emitter fiber(s). The light focusing means will focus the emerging light toward the storage phosphor imaging plate. Use of a light focusing means for focusing the emerging light increases both the efficiency and resolution of a scanner by concentrating the emerging light to a small area on the storage phosphor imaging plate.

The fiber optic cable also comprises a means for collecting light into the distal end of the collecting fiber(s). The light collecting means will increase the amount of phosphorescence from the storage phosphor imaging plate collected by the collecting fiber(s) thereby increasing the sensitivity of the scanner.

Generally, the light focusing means and light collecting means will be a single lens, and preferably a graded index (GRIN) lens, although modules comprising curved mirrors to focus the beam or multi-lens devices are also acceptable. The refractive index of the lens will be in the range of about 1.5 to about 1.65, preferably about 1.59. The pitch of the lens will generally be in the range of about 0.1 to about 0.99 and preferably about 0.33. The lens may be coated with an anti-reflective coating such as $MgF_2$, HEBBAR ® coatings, V-coatings or the like. The focal length of the lens will preferably be greater than or equal to the tolerance of the storage phosphor imaging plate being scanned.

Storage phosphor imaging plate scanners may be constructed to incorporate the novel fiber optic cable described above. One element of a storage phosphor imaging plate scanner is a light source. As described above, the term "light" indicates electromagnetic radiation of any wavelength capable of inducing phosphorescence from the phosphor present on the storage phosphor imaging plate being scanned. The type of light source employed is not critical and may vary so long as the light produced will produce phosphorescence in the phosphor on the storage phosphor imaging plate being scanned. Generally the light source will be a laser, preferably a diode laser. The laser may be chosen so as to optimize phosphor excitation and phosphorescence. The laser may emit continuous radiation or preferably pulsed radiation. Pulsing the laser output allows for more discrete scanning of the storage phosphor imaging plate.

The distal end of the bifurcated optical fiber bundle, the means for focusing light out of the distal end of the emitter fiber(s), and the means for collecting light into the distal end of the collecting fiber(s) may be potted in a stainless steel ferrule with HYSOL ® epoxy and polished.

In a storage phosphor imaging plate scanner, the focusing/imaging lens will be securely connected to a lens mount. If the focusing/imaging lens is potted in a stainless steel ferrule, the lens mount may be securely connected to the stainless steel ferrule. The lens mount may allow for adjustment of the lens position within the lens mount. When properly adjusted, the lens may be fixed in place with an adhesive such as optical grade epoxy.

The lens mount is connected to a two dimensional scanning mechanism. The two dimensional scanning mechanism is able to precisely locate the distal end of the fiber optic cable over the storage phosphor imaging plate being scanned. Although it is not critical, an X-Y flatbed scanning device such as a Houston Instruments ® Model HI 1117 is preferred. The two dimensional scanning mechanism will generally comprise two stepper motors. The stepper motors are controlled by scanning electronics integrated with a clock circuit. Commercially available scanning mechanisms such as those used in flatbed plotters may be employed.

The proximal end of the collecting fiber(s) is joined to a sensor. The sensor is capable of being stimulated by phosphorescence from the storage phosphor imaging plate and producing an electronic signal representing the sensed phosphorescence. The sensor may be a photodiode, or preferably, a photomultiplier tube. A photomultiplier tube provides better sensitivity over the full range of visible phosphorescent emissions. A bandpass filter may be placed between the proximal end of the collecting fiber(s) and the sensor. The bandpass filter may selectively allow light having the wavelength of the phosphorescence to pass while blocking light having the wavelength of light from the light source. In this manner, the bandpass filter provides greater specificity of the signals generated by the sensor.

The electronic signals representing phosphorescence from the storage phosphor imaging plate will be transmitted to a data storage device. The data storage device is typically a computer. The computer may be an integral part of the storage phosphor imaging plate scanner or be external to the scanner. Generally electronic signals from the sensor are in analog form. The computers used in scanning devices are most conveniently digital. Signal conditioning electronics, such as an analog digital converter, are required to translate the analog signal to a digital signal. Other signal conditioning means such as a pre-amplifier followed by a track and hold amp may be required to translate the electronic signals from the sensor to the data acquisition device in specialized applications.

Computers used as data acquisition devices may also control the scanning mechanism. By this means the computer may correlate the location of the scanning mechanism and the signal from that location. The computer can then provide a reconstruction of the latent image encoded on the storage phosphor imaging plate. Commercially available software such as Hewlett Packard ® Graphics Language allows control of scanning mechanisms such as addressable scanning heads.

The computer may also be programmed to alter the scanning interval. By increasing the number of points scanned on a storage phosphor imaging plate, the computer increases the resolution of the scanner. By decreasing the number of locations scanned on a storage phosphor imaging plate, the computer decreases the resolution of the scanning device. The scanning speed is inversely proportional to the number of locations scanned.

The scanning speed may also be increased by scanning only those areas of the storage phosphor imaging plate having a latent image present. The computer may be programmed to scan the storage phosphor imaging plate in sectors. If the first location scanned in a sector produces phosphorescence, the computer receives the signal and continues to scan the sector. If the computer does not receive a signal representing phosphorescence, the computer adjusts the scanning mechanism to scan the next sector. In this way, the scanner can closely scan sectors having encoded information within the sector while not scanning sectors not having encoded information. This allows both rapid scanning and high resolution.

Referring now to FIG. 1, there is shown a schematic illustration of one embodiment of a storage phosphor imaging plate scanner of the present invention. The light source 1, such as a laser or light emitting diode (LED), produces light which is focused through a GRIN lens 2. The GRIN lens 2 focuses the light into emitter fiber(s) 3. The emitter fiber(s) 3 joins with the collecting fibers 7 to comprise the bifurcated optical fiber bundle 4. Light from the light source 1 is transmitted by the emitter fiber(s) 3 through the bifurcated optical fiber bundle 4 to the imaging/focusing lens 5 and focused on a small area on the storage phosphor imaging plate 6. If a latent image is on the storage phosphor imaging plate 6 at the area exposed to light from the light source 1, the phosphor will be excited and emit phosphorescence of a particular wavelength. If a latent storage is not present on the storage phosphor imaging plate 6 at the area exposed to light from the light source 1, no phosphorescence will be produced. Assuming that light from the light source 1 strikes phosphor that contains a latent image on the phosphor imaging storage plate 6, the phosphorescence will strike and enter the focusing/imaging lens 5 and be transmitted to the collecting fiber(s) 7 in the bifurcated optical fiber bundle 4. The collecting fiber(s) 7 direct the phosphorescent light to a sensor 8, such as a photomultiplier tube or photodiode, which detects the phosphorescent light and produces an electronic analog signal. A bandpass filter 20 may be placed between the collecting fiber(s) 7 and the sensor 8. The sensor 8 is interfaced with an analog signal conditioning circuit 9. The conditioned analog signal is directed to an internal computer 10 capable of storing the information from the sensor 8 or transmitting the information to an optional external computer 11.

The distal end of the bifurcated optical fiber bundle 4 and the focusing/imaging lens 5 are contained in a scanner head 12. The location of the scanner head 12 over the phosphor imaging storage plate 6 is controlled by a 2-dimensional mechanical scanner 13. The internal computer 10 controls the mechanical scanner 13 and the location of the scanner head 12 over the phosphor imaging plate 6. The internal computer 10 may store the information identifying the location of the scanner head 12 or may direct the information to an external computer 11. Either the internal computer 10 or external computer 11 are capable of coordinating the scanner head location information and the sensor information to reconstruct the information stored on the phosphor imaging plate 6.

The bifurcated optical fiber bundle is illustrated in FIG. 2. Proximally, the emitter fiber(s) 3 is not joined to the collecting fiber(s) 7. More distally, the emitter fiber(s) 3 joins the collecting fiber(s) 7 to form the bifurcated optical fiber bundle 4.

The proximal end of the emitter fiber(s) 3 is joined to a GRIN lens 2. The GRIN lens 2 focuses light from the light source into the emitter fiber(s) 3 with high efficiency.

The proximal end of the collecting fiber(s) 7 joins a sensor. The sensor may be a photodiode or preferably a photomultiplier tube. A bandpass filter may be placed between the collecting leg 7 and the sensor.

The bifurcated optical fiber bundle 4 comprises a plurality of optical fibers having proximal ends and distal ends. The distal ends of the fibers coincide at the focusing/imaging lens 5. As shown in FIG. 4, the optical fibers of the bifurcated optical fiber bundle 4 are surrounded by a flexible protective covering 19 such as PVC monocoil or the like.

Referring now to FIG. 5, in a storage phosphor imaging plate scanner, the focusing/imaging lens 5 and the distal portion of the bifurcated fiber bundle 4 are contained within a scanning head 12. The focusing/imaging lens 5 is positioned in the scanning head 12 by set screws 18 (see FIG. 6). The set screws 18 allow the tolerance to be finely adjusted. After the tolerance is adjusted and the set screws 18 are tightened, the adjustment may be fixed with an adhesive such as optical grade epoxy.

FIG. 7 illustrates a focusing/imaging lens 5 with a reflective coating 21.

In a preferred embodiment of the optical fiber cable and a scanner using the cable, a bifurcated optical fiber cable was built having a single emitter fiber with a fused silica core, an internal diameter of 200 $\mu$m, a fused silica cladding, and a numerical aperture of 0.4. The collecting fibers have a fused silica core, an internal diameter of 200 $\mu$m, a polymer cladding, and a numerical aperture of 0.4.

The coupling lens is a GRIN lens and focuses light from a diode laser into the emitter fiber. The lens has an anti-reflective coating of $MgF_2$ to minimize losses at a laser wavelength of 910-920 nm. The coupling lens is fit into a 3 dimensional positioner which may be adjusted to minimize coupling losses. The light source is a diode laser. The diode laser, the coupling lens, and the emitter fiber are fixed in place with an adhesive.

The focusing imaging lens is also of the GRIN type. The emitted light is focused onto an area of 130 $\mu$m. The lens is coated with $MgF_2$ to minimize reflective losses throughout the phosphorescent emission spectra (450-500 nm).

The distal portion of the bifurcated optical fiber bundle and the focusing/imaging lens are in a scanning head. The scanning head is mated with the scanning mechanism. The tolerance between the phosphor storage plate and the focusing/imaging lens is adjusted and fixed with an adhesive.

The laser diode is driven by a laser pulser. The diode laser emits light with a wavelength ranging from 910-920 nm and a line width of less than 12 nm. The diode laser is capable of a repetition rate of 8 KHz, a pulse width of 200 nsec, a duty cycle of 0.05%, a peak power of 15 W, and requires no more than 40 A peak current. The pulse to pulse variation in output power is less than 5% during scanning.

The sensor is a photomultiplier tube operated at high voltage and optimized for this application. A Schott ® BG-39 bandpass filter is positioned between the photomultiplier tube and the collecting fibers to block infrared laser wavelengths.

The analog signal conditioning circuit is a fast amplifier followed by a fast track and hold. The output of the detector is fed to this circuit. The output of the track and hold is supplied to a 16 bit analog-to-digital (A/D) converter.

A master clock circuit decodes the stepper motor drive signals yielding a positionally related clock pulse that synchronizes the actions of the laser, gated integrator, computer and A/D converter with the stepper motors of the translation mechanism.

The clock pulse is buffered through a programmable frequency divider allowing values of n=0 to 9 for $T_n$, the final clock period generated by this circuit.

The signals generated by the master clock circuit have a jitter of less than 50 nanoseconds in relation to the laser pulse trigger and a rise time of less than 25 nanoseconds.

The A/D and I/0 board is located in the expansion slots of the internal computer motherboard. The A/D converter digitalizes the analog signal from the track and hold and stores the data on the internal computer hard disc. The I/0 board provides digital inputs for sensing the laser interlocks, for sensing the line syncs and frame syncs, and digital outputs for controlling the resolution of the instrument via the master clock circuit.

Using the above apparatus, data was taken using a phosphor coated plate. The spectral absorption curve of this phosphor is in the near infrared, with the emission being in the blue visible.

A series of dots were blotted onto paper using a fluid in which phosphorus 32, a radioisotope, was suspended. The paper was then placed in direct contact with the phosphor coated plate. The plate was scanned using the above apparatus.

FIG. 8 illustrates the dynamic range of the scanner. The vertical axis is the log of phosphorescence intensity and the horizontal axis is the log of liquid scintillation counts. The scanner shows good linearity over four orders of magnitude, far superior to x-ray film with a typical linear range of about two orders of magnitude.

The foregoing is offered primarily for purposes of illustration. It will be readily apparent to those of skill in the art that the components of the optical fiber cable and the storage phosphor imaging plate scanner, the steps of the scanning method, and other parameters of the invention described herein may be further modified or substituted in various ways without departing from the spirit and scope of the invention.

What is claimed is:

1. An optical fiber cable for scanning a storage phosphor imaging plate, said optical fiber cable comprising:
   a bifurcated bundle of optical fibers having distal and proximal ends, said optical fibers comprising at least one emitter fiber and at least one collecting fiber;
   means for focusing light into the proximal end of said at least one emitter fiber;
   means for focusing light out of the distal end of said at least one emitter fiber; and
   means for collecting light in the distal end of said at least one collecting fiber.

2. An optical fiber cable of claim 1, wherein said means for focusing light into the proximal end of said at least one emitter fiber comprises a GRIN type coupling lens.

3. An optical fiber cable of claim 1, wherein said means for focusing light out the distal end of said at least one emitter fiber comprises a lens.

4. An optical fiber cable of claim 1, wherein said means for collecting light in the distal end of said at least one collecting fiber comprises a lens.

5. An optical fiber cable of claim 1, wherein both said means for focusing light out of the distal end of said at east one emitter fiber and said means for collecting light in the distal end of said at least one collecting fiber comprise a single lens.

6. An optical fiber cable for scanning a storage phosphor imaging plate, said optical fiber cable comprising:
   a bifurcated bundle of optical fibers having distal and proximal ends, said optical fiber cable further comprising at least one emitter fiber and at least one collecting fiber;
   a GRIN type coupling lens joined to the proximal end of said at least one emitter fiber; and
   a focusing/imaging lens joined to the distal ends of said at least one emitter fiber and at least one collecting fiber.

7. An optical fiber cable of claim 6, wherein the bifurcated bundle has only one emitter fiber.

8. An optical fiber cable of claim 6, wherein said bifurcated bundle has a plurality of collecting fibers disposed concentrically around said at least one emitter fiber.

9. An optical fiber cable of claim 6, wherein said focusing/imaging lens is a GRIN type lens.

10. An optical fiber cable of claim 6, wherein said focusing/imaging lens further comprises an anti-reflective coating.

11. An optical fiber cable of claim 6, wherein said focusing/imaging lens has a focal length greater than or equal to the tolerance of said storage phosphor imaging plate.

12. An optical fiber cable of claim 6, wherein said GRIN type coupling lens joined to the proximal end of said at least one emitter fiber further comprises an anti-reflective coating.

13. A storage phosphor imaging plate scanner having a sampling interval comprising:
   a light source;
   an optical fiber cable of claim 6, wherein said GRIN type coupling lens mates said light source to said at least one emitter fiber of said optical fiber cable;
   a lens mount secured to said focusing/imaging lens;
   a scanning mechanism joined to said lens mount;
   a sensor joined to the proximal ends of said at least one collecting fiber in said optical fiber cable;
   signal conditioning electronics which receive input from said sensor;
   a data storage device which receives input from said signal conditioning electronics.

14. A storage phosphor imaging plate scanner of claim 13, wherein said sensor is a photodiode.

15. A storage phosphor imaging plate scanner of claim 13, wherein said sensor is a photo-multiplier tube.

16. A storage phosphor imaging plate scanner as in claim 13, further comprising a bandpass filter which blocks light of the wavelength emitted by said light source and is positioned between said sensor and said at least one collecting fiber.

17. A storage phosphor imaging plate scanner as in claim 13, wherein said scanning mechanism is an addressable scanning head.

18. A storage phosphor imaging plate scanner as in claim 13, wherein said data storage device is a computer.

19. A storage phosphor imaging plate scanner as in claim 18, wherein said computer controls said scanning mechanism.

20. A storage phosphor imaging plate scanner as in claim 18, wherein said computer can alter said sampling interval.

21. A storage phosphor imaging plate scanner as in claim 13, wherein said light source is a laser.

22. A storage phosphor imaging plate scanner as in claim 21, wherein said laser is a diode laser.

23. A storage phosphor imaging plate scanner as in claim 13, further comprising an analog to digital converter capable of converting an analog signal from said sensor to a digital signal for transfer to said data storage device.

24. A storage phosphor imaging plate scanner as in claim 13, wherein said scanning mechanism is an X-Y scanning mechanism.

25. A method of scanning a storage phosphor imaging plate, said method comprising:

(a) transmitting radiation from a light source into at least one selected optical fiber of an optical fiber bundle and, upon emerging therefrom, to said storage phosphor imaging plate;

(b) collecting phosphorescence induced by the radiation from said light source in at least one optical fiber of said optical fiber bundle other than said selected optical fiber;

(c) transmitting said phosphorescence induced by the radiation from said light source to a sensor; and (d) transmitting information representative of said phosphorescence induced by said radiation from said light source from said sensor to a data storage device.

26. The method of claim 25, wherein said radiation from a light source of step (a) is pulsed radiation.

27. The method of claim 25, wherein said data storage device is a computer which controls a scanning mechanism joined to said optical fiber bundle.

28. The method of claim 27, wherein said computer alters the sampling interval in response to the latent image contained in the phosphorescence imaging plate.

29. The method of claim 25, wherein said radiation from a light source of step (a) is focused into said selected optical fiber.

30. The method of claim 29, wherein a GRIN type lens focuses said radiation from a light source into said selected optical fiber.

31. The method of claim 25, wherein said radiation from a light source is focused toward a point on said storage phosphor imaging plate upon emerging from said selected optical fiber of an optical fiber bundle in step (a).

32. The method of claim 31, wherein a GRIN type lens focuses said radiation from a light source toward a point on said storage phosphor imaging plate.

33. The method of claim 25, wherein said phosphorescence induced by the radiation from said light source is collected by an imaging lens and transmitted to said at least one optical fiber of said optical fiber bundle other than said selected optical fiber in step (b).

34. The method of claim 33, wherein said imaging lens also focuses radiation from a light source toward a point on said storage phosphor imaging plate upon emerging from said selected optical fiber of an optical fiber bundle in step (a).

* * * * *